Nov. 5, 1940.  A. E. SKOLRUD  2,220,380
CORN CUTTER
Filed Aug. 2, 1939    3 Sheets-Sheet 3
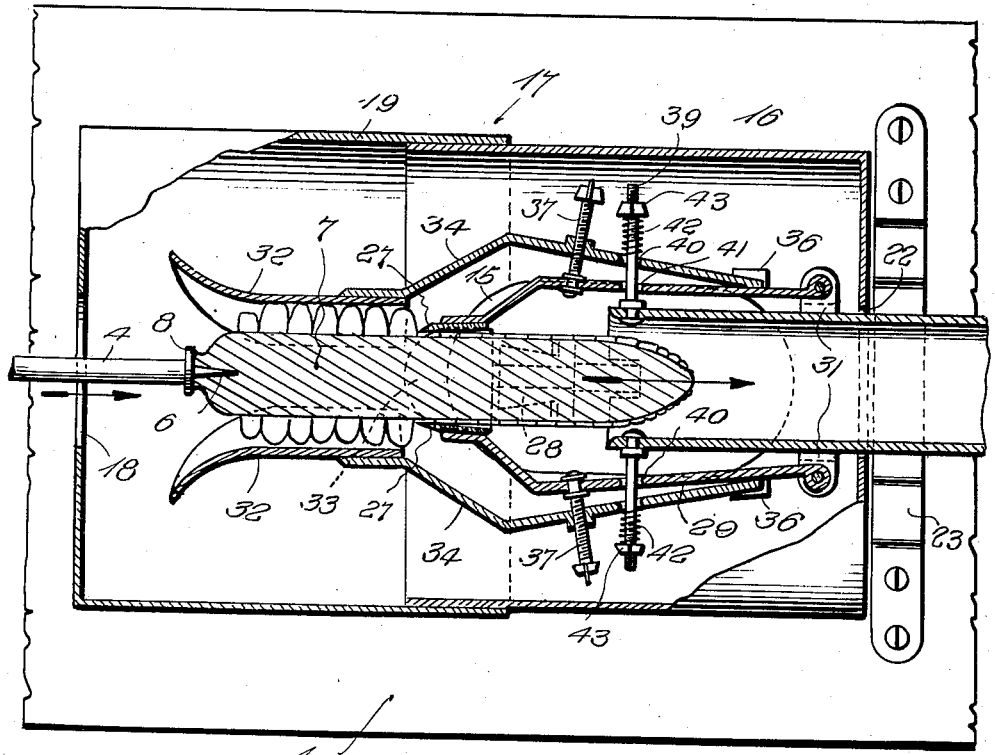
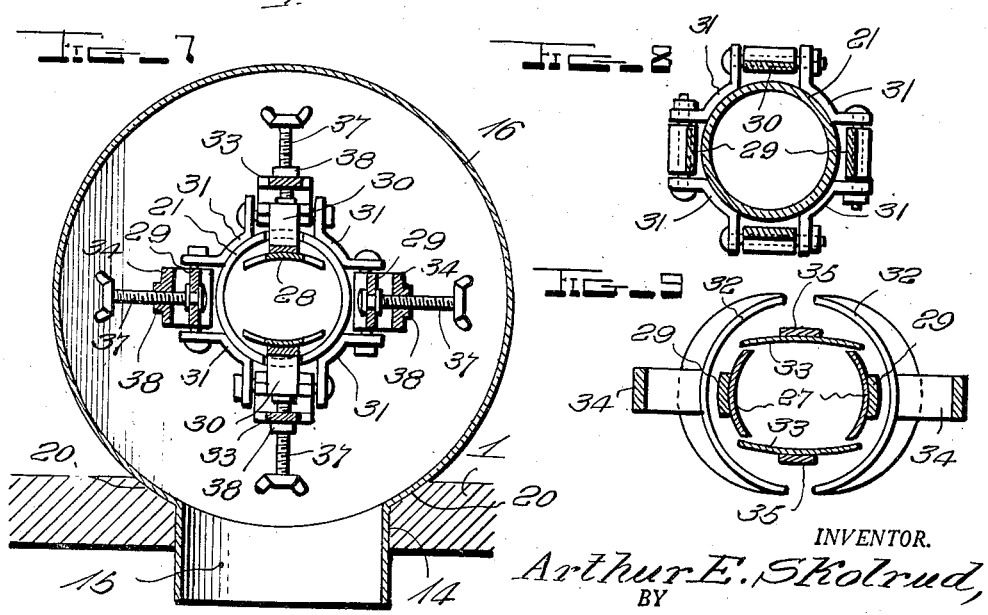
INVENTOR.
Arthur E. Skolrud,
BY
Ross J. Woodward, ATTORNEY.

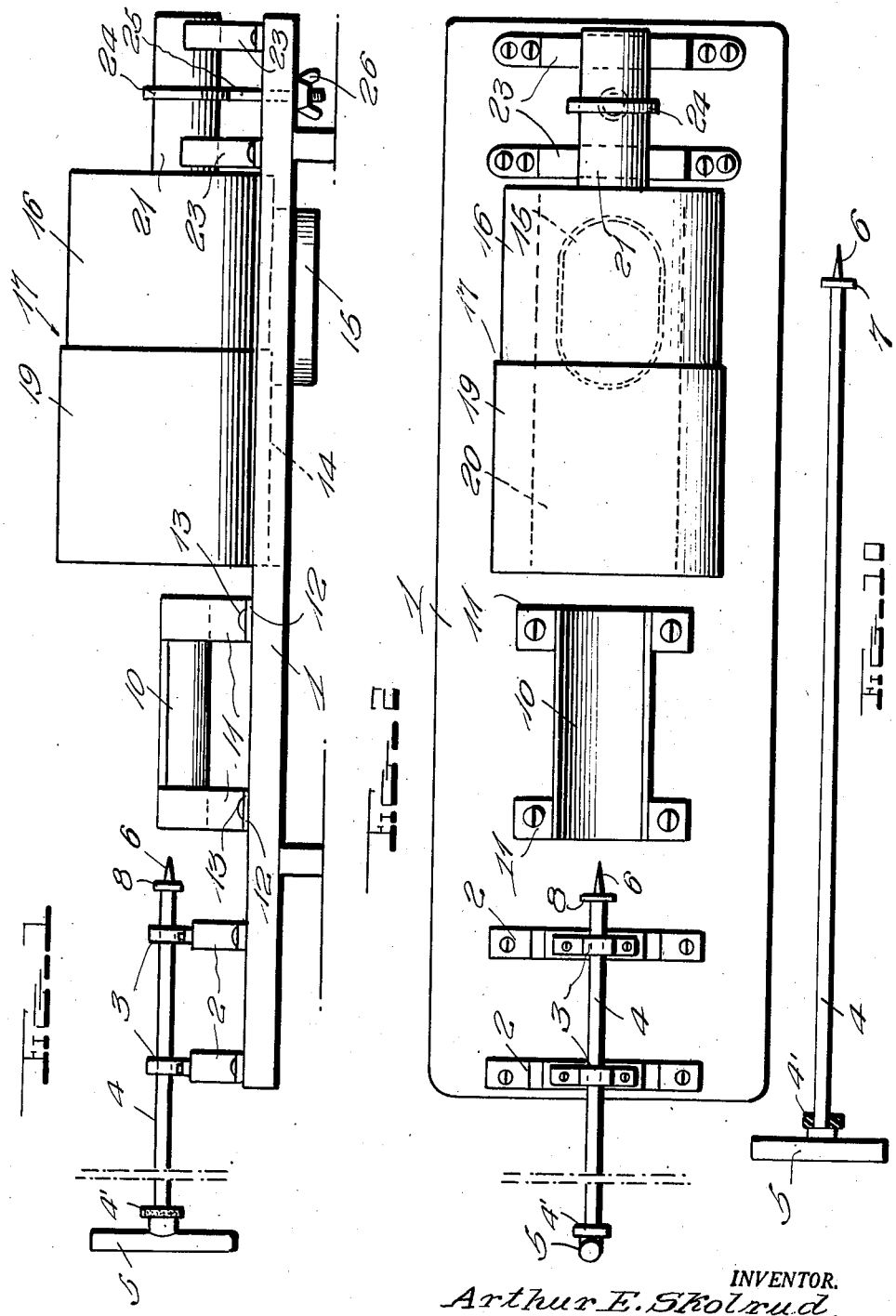

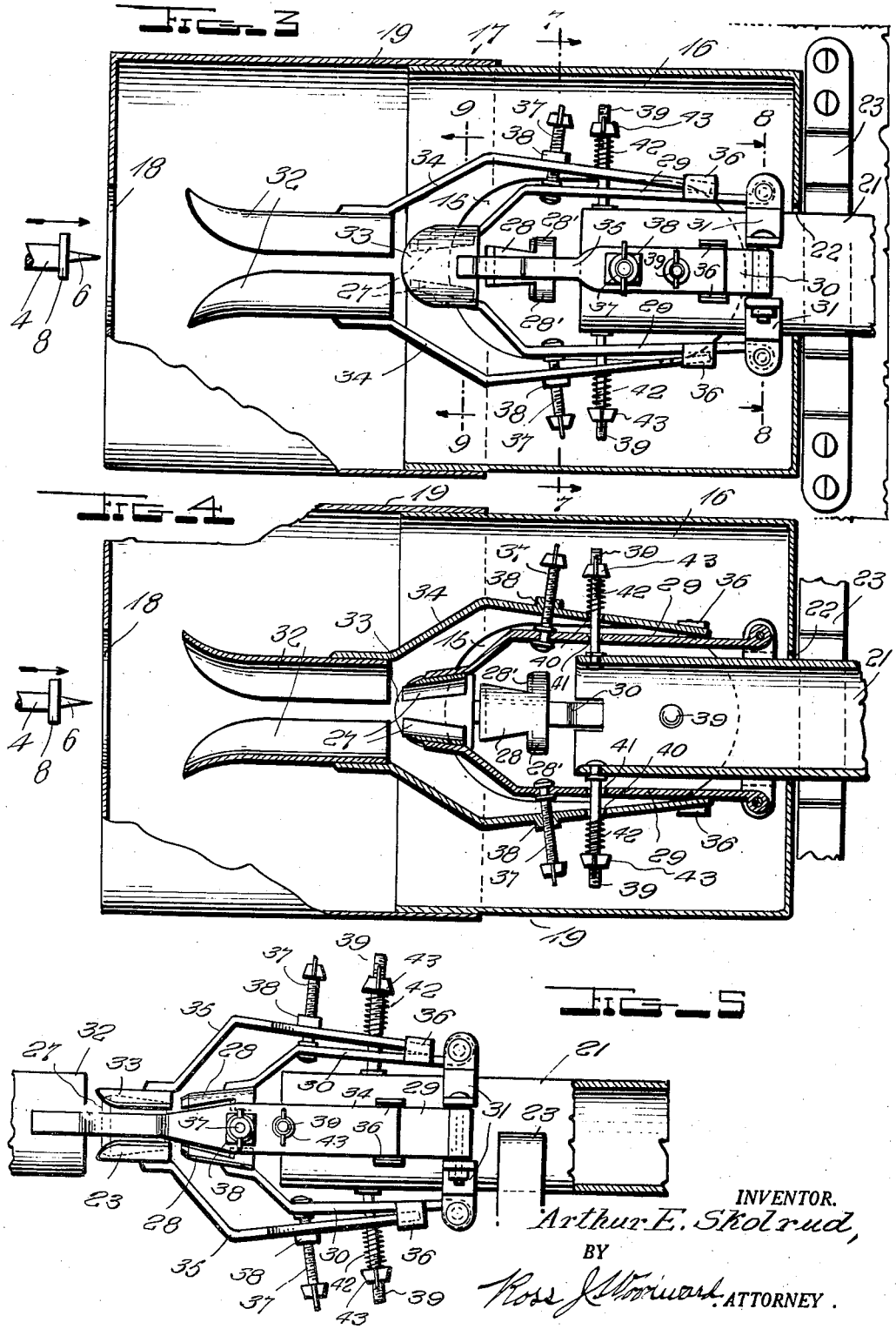

Patented Nov. 5, 1940

2,220,380

UNITED STATES PATENT OFFICE 2,220,380

CORN CUTTER

Arthur E. Skolrud, Hamilton, Mont., assignor, by direct and mesne assignments, to S. & P. Manufacturing Company, a corporation of Montana Application August 2, 1939, Serial No. 288,007

4 Claims. (Cl. 130—9)

This invention relates to a corn cutter and it is one object of the invention to provide a machine of this type by the use of which corn may be quickly and very easily cut from a cob, the cut corn being discharged through an outlet and the cobs through another outlet.

Another object of the invention is to provide a machine of such construction that by imparting longitudinal movement to an ear of corn the kernels will be cut from the cob for the entire circumference thereof and the cob discharged through an outlet provided therefor.

Another object of the invention is to provide a machine which is manually operated and includes in its construction a cradle to receive the ear of corn, a plunger for imparting longitudinal movement to the ear, knives for cutting the corn from the cob as the ear of corn is moved longitudinally, and a discharge tube through which the cob is moved as the corn is cut from the cob.

Another object of the invention is to provide a corn cutting machine of this character wherein the cutting mechanism consists of a plurality of knives carried by arms pivoted to the discharge tube for the cobs, guides for directing movement of the ear of corn being associated with the knives and disposed in advance thereof where they will very effectively guide the ear of corn and, in addition, cause the knives to accurately cut the corn from the cob.

Another object of the invention is to so mount the knives and the guides that the knives may be adjusted radially and thus caused to cut the corn in predetermined relation to the cob as the ear of corn is moved longitudinally.

Another object of the invention is to so mount the knives that when the ear of corn is thrust longitudinally between the knives they will serve to cut corn from the cob for the entire circumference thereof.

Another object of the invention is to provide a corn cutter which is simple in construction, very easy to operate, and not liable to get out of order.

The invention is illustrated in the accompanying drawings, wherein:

Fig. 1 is a side elevation of the improved corn cutting machine.

Fig. 2 is a top plan view thereof.

Fig. 3 is a view showing the casing in longitudinal section and the discharge tube, the cutting mechanism and the guide means in top plan.

Fig. 4 is a view similar to Fig. 3, but showing the mechanism within the casing in longitudinal section and in its normal position.

Fig. 5 is a view showing the mechanism within the casing in side elevation.

Fig. 6 is a view similar to Fig. 4, showing the manner in which corn is cut from a cob by the knives.

Fig. 7 is a transverse sectional view taken on the line 7—7 of Fig. 3.

Fig. 8 is a sectional view on the line 8—8 of Fig. 3.

Fig. 9 is a sectional view on the line 9—9 of Fig. 3.

Fig. 10 is a view of the plunger for moving an ear of corn longitudinally.

This improved corn cutting machine has a base 1 which may be formed of wood, metal, or any other suitable material. The base is of greater length than width and adjacent its rear end carries blocks 2 spaced from each other longitudinally of the base and carrying bearings 3 through which a plunger 4 is slidably mounted. A rubber cushioning ring 4' acts as a shock absorber when the plunger is thrust forwardly. The plunger is formed from a rod of strong metal having a handle 5 at its rear end and its front end is tapered to form a spur 6 of a length adapting it to be firmly embedded in the cob of an ear of corn 7, as shown in Fig. 6. A collar 8 surrounds the prong at the base thereof and constitutes means for limiting the extent to which the prong may penetrate the corn cob and also serves as an abutment and permits the ear of corn to be moved longitudinally without danger of splitting when the plunger is thrust forwardly.

A cradle 10 for receiving an ear of corn is disposed in advance of the plunger and is supported above the base and maintained longitudinally thereof by legs or other suitable supports 11 having feet, 12 through which securing screws 13 are passed and into the base. An opening 14 is formed through the base in spaced relation to the front end thereof and through this opening passes the spout or discharge neck 15 through which kernels of corn cut from the cob are to be discharged from the front section 16 of the casing 17. The opening 14 is of sufficient length to receive the lower portion of the casing which is seated therein and prevents the casing from turning out of a position in which its axis extends longitudinally of the base. Therefore, the casing will be maintained in its proper position and the inlet opening 18 formed in the rear section 19 of the casing will be maintained in alinement with the cradle. It should also be noted that the side walls of the opening 14 are beveled, as shown at 20 in Fig. 7, to provide flat surfaces upon which portions of the casing sections rest when the casing is set in place with its lower portion engaged in the opening. The two sections of the casing have telescoping engagement with each other and it will be readily understood that the rear section 19 may be easily withdrawn from the front section 16. A discharge tube or spout 21 through which corn cobs are passed extends through an opening 22 formed in the casing section 16 in alinement with the opening 18 and in order to support this tube, there are provided saddles 23. These saddles are secured upon the base transversely thereof between the opening 14 and the front end of the base, in spaced relation to each other and the spout is firmly but detachably held upon the saddles by a ring clamp 24 which fits about the spout and has a depending shank 25 which passes through the base and carries a wing nut 26 by means of which it is tightened to exert downward pull and hold the spout firmly upon the saddles. When the nut is removed the spout and the casing together with mechanism carried by the spout, may be lifted, the section 19 of the casing detached from the section 16 thereof, and the spout and the mechanism carried thereby withdrawn from the casing section 16. Mechanism carried by the discharge tube or spout, and normally housed within the casing, may then be cleaned or adjustments or repairs made and the casing sections then applied and the spout secured upon the saddles with the casing resting in the opening 14 upon the beveled faces 20 of its side walls.

In order to cut corn from the cobs as the ears of corn are fed through the machine, there have been provided blades 27 and 28 carried by arms 29 and 30. These arms extend longitudinally of the tubular spout 21 and, at their forward ends, are pivotally mounted between the outstanding ears of bearing brackets 31 welded or otherwise secured upon the spout and extending circumferentially about the same, as shown in Fig. 8. Guiding plates 32 and 33 which are arcuate transversely, are carried by arms or shanks 34 and 35 which extend longitudinally of the arms 29 and 30 externally thereof with their front ends bearing upon the arms between tongues 36 projecting outwardly from the arms at opposite sides thereof. Threaded stems 37 which are swiveled to the arms 29 and 30 engage through threaded openings in the shanks of the guide plates at the bosses 38 and it will be readily understood that by turning the stems the shanks may be angularly adjusted relative to the arms 29 and 30. Pins 39 extend radially from the spout through openings 40 and 41 formed in the arms 29 and 30 and the shanks 34 and 35 and these pins carry springs 42 held under desired compression by wing nuts 43 threaded upon outer end portions of the pins. The springs serve to urge the shanks and the arms inwardly toward the spout and permit them to be forced away from the same when the plates are spread by an ear of corn thrust between them by the plunger. The shanks of the plates and the arms carrying them move together. Therefore, when the plates are spread by an ear of corn the blades carried by the arms will also be spread and so spaced from each other that the corn cob may pass between the companion blades which serve to cut corn from the cob as the ear of corn is moved forwardly. By adjusting the threaded stems 37 the blades will be so spaced with relation to the companion plates that they will be disposed as close to the corn cob as desired and the corn will be cut in predetermined closeness to the cob. When the ear of corn is thrust forwardly between the plates 32, the blades 27 first come into play to cut corn from the cob at opposite sides thereof for a portion of its circumference. As the blades 27 come into use, the plates 33 are spread and the blades 28 will be then properly positioned to cut corn from the cob in desired closeness thereto. These blades cut the corn which passes between the blades 27 and it will be readily understood that the blades 27 and 28 cooperate with each other to cut corn from the cob for the entire circumference of the cob. In case an extra large ear of corn is passed through the cutting machine, the plates and blades may be spread to such an extent that the blades will not define an unbroken circle about the corn cob and lines of uncut corn would be left upon the cob between the portions cut by the blades 27 and the portions cut by the blades 28. In order to prevent this, the blades 28 have side extensions or auxiliary blades 28' which will extend in overlapping relation to side edges of rear ends of the blades 27 and serve to cut any corn missed by the blades 27 and 28.

When this corn cutting machine is in use, it is set upon a suitable support with the spout 15 over a receptacle to receive the corn cut from the cob and a receptacle may also be disposed under the outer end of the spout 21 to receive the corn cobs. The plunger is grasped by its handle and drawn rearwardly to the position shown in Fig. 2. An ear of corn is placed upon the cradle 10 and the plunger then thrust forwardly to embed its prong 6 in the rear end or butt end of the corn cob. Forward movement of the plunger is continued and the ear of corn will be thrust forwardly into the opening 18 of the casing and forwardly therein to pass between the plates and blades. During this movement, the blades cut the corn from the cob and the cob will pass out through the discharge tube or spout 21. The corn which is cut from the cob drops downwardly in the casing and passes out through the spout 15. After the ear of corn has been thrust through the casing between the plates and knives and into the discharge spout, the plunger is drawn rearwardly to the position of Fig. 2, and another ear of corn placed upon the cradle and the plunger again advanced to thrust the ear of corn through the cutting machine. It will thus be seen that ears of corn may be easily and quickly fed through the cutting machine, the cut corn being discharged through the spout 15 and the cobs through the spout 21. It will also be seen that by adjusting the stems 37, the plates and knives may be disposed in proper spaced relation to each other to cause the corn to be cut in predetermined closeness to the cobs and by adjusting the nuts 43 the springs may be placed under such tension that the plates may be held against the ears of corn without sufficient pressure being exerted to crush or bruise the corn.

Having thus described the invention, what is claimed is:

1. In a corn cutting machine; a base formed with an opening, a casing seated in the opening and having an outlet opening for corn in its lower portion and a spout surrounding the opening and extending downwardly through the opening in the base, the rear end of the casing being formed with an inlet opening and the front end of the casing being formed with an opening alined with the inlet opening, saddles carried by said base in front of said casing, a discharge spout for corn cobs resting on said saddles and extending into the casing through the opening at the front thereof, a ring surrounding said spout between said saddles and having a stem extending downwardly and through the base, a nut carried by the lower end of the stem for drawing the ring downwardly and firmly holding the spout upon the saddles, a cradle carried by said base and extending longitudinally thereof back of said casing, guides mounted over said base back of said cradle, a plunger slidable through said guides for engaging the cob of an ear of corn resting upon the cradle and thrusting the ear of corn forwardly through the casing and the cob into the discharge spout, and means in the casing for cutting corn from the cob as the ear of corn is moved forwardly through the casing toward the discharge spout.

2. In a corn cutting machine, a base formed with an opening, a casing seated in the opening and having an outlet opening for corn in its lower portion and a spout surrounding the opening and extending downwardly through the opening in the base, the rear end of the casing being formed with an inlet opening and the front end of the casing being formed with an opening alined with the inlet opening, saddles carried by said base in front of said casing, a discharge spout for corn cobs resting on said saddles and extending into the casing through the opening at the front thereof, a ring surrounding said spout between said saddles and having a stem extending downwardly and through the base, a nut carried by the lower end of the stem for drawing the ring downwardly and firmly holding the spout on the saddles, means for moving an ear of corn forwardly through the casing and the cob into the discharge spout, and means in the casing for cutting corn from the cob as the ear of corn is moved forwardly through the casing.

3. In a corn cutting machine, a discharge spout, means for advancing ears or corn longitudinally towards said spout, arms pivoted to said spout in spaced relation to each other circumferentially thereof and extending longitudinally of the spout with their free ends projecting from the inlet end of the spout, blades carried by said arms rearwardly of the spout for cutting corn from the cobs of ears of corn advanced and moved longitudinally through the spout, certain of said arms being of greater length than others to provide sets of front and rear blades, ears carried by said arms at opposite side edges thereof, guide plates spaced rearwardly from companion blades and having shanks extending forwardly longitudinally of and in overlying relation to the arms of companion blades with their front ends resting on the companion arms between the ears carried thereby, stems swiveled to said arms and extending outwardly therefrom and threaded through companion shanks to adjust the shanks toward and away from the companion arms, pins carried by said discharge spout and extending radially outward therefrom and passing loosely through companion arms and shanks, springs carried by said pins with their inner ends abutting the shanks, and nuts carried by said pins and engaging outer ends of said springs to tension the springs and urge the shanks and arms toward the spout and yieldably hold the blades in position to engage ears of corn and dispose the blades in position to cut corn from the cobs in predetermined relation to the cobs as the ears of corn are moved through the casing toward the discharge spout.

4. In a corn cutting machine, a base, a casing carried by the base and having an opening at its front end, supports carried by said base in front of the casing and spaced from each other, a discharge spout for corn cobs resting on said supports and extending into the casing through the opening at the front thereof, a clamp engaged about said spout between the supports and having a stem extending downwardly through the base, fastener means for drawing the stem downwardly and exerting pull on the clamp to hold the spout firmly on said supports, means for moving an ear of corn forwardly through the casing and forcing the cob thereof into the discharge spout, and means for cutting corn from the cob as the ear of corn is moved forwardly through the casing.

ARTHUR E. SKOLRUD.